June 2, 1953  J. VILLARS  2,640,562
LIFTING APPLIANCE FOR VEHICLES
Filed March 10, 1948  3 Sheets-Sheet 2
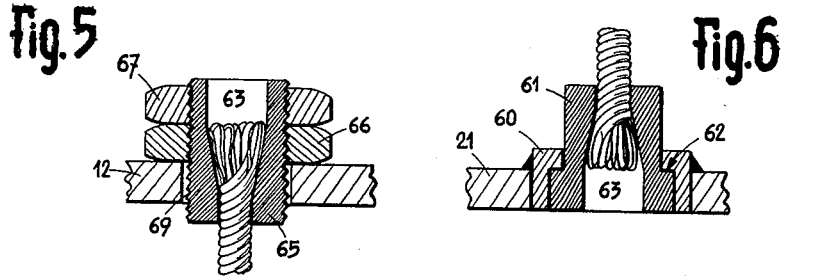
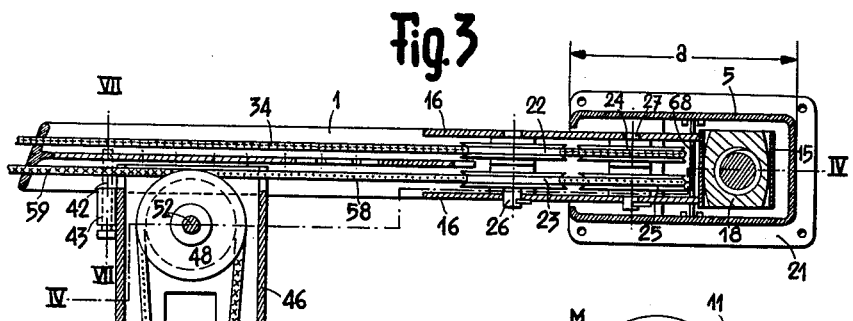
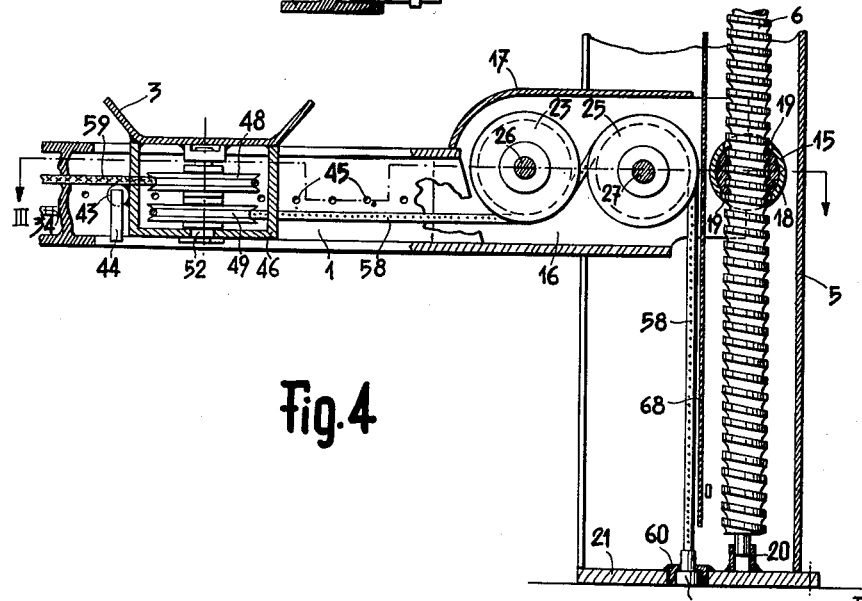
Inventor
*Julio Villars*.
BY
Attorney June 2, 1953 J. VILLARS 2,640,562
LIFTING APPLIANCE FOR VEHICLES
Filed March 10, 1948 3 Sheets-Sheet 3
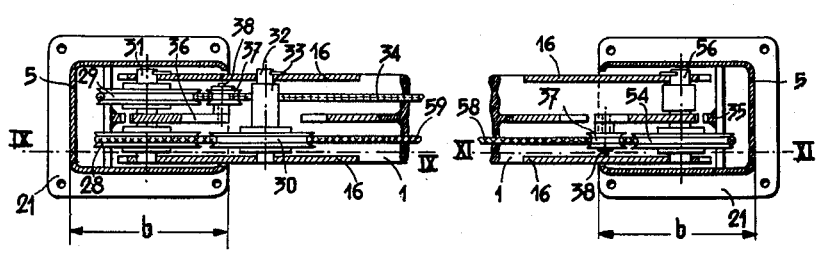
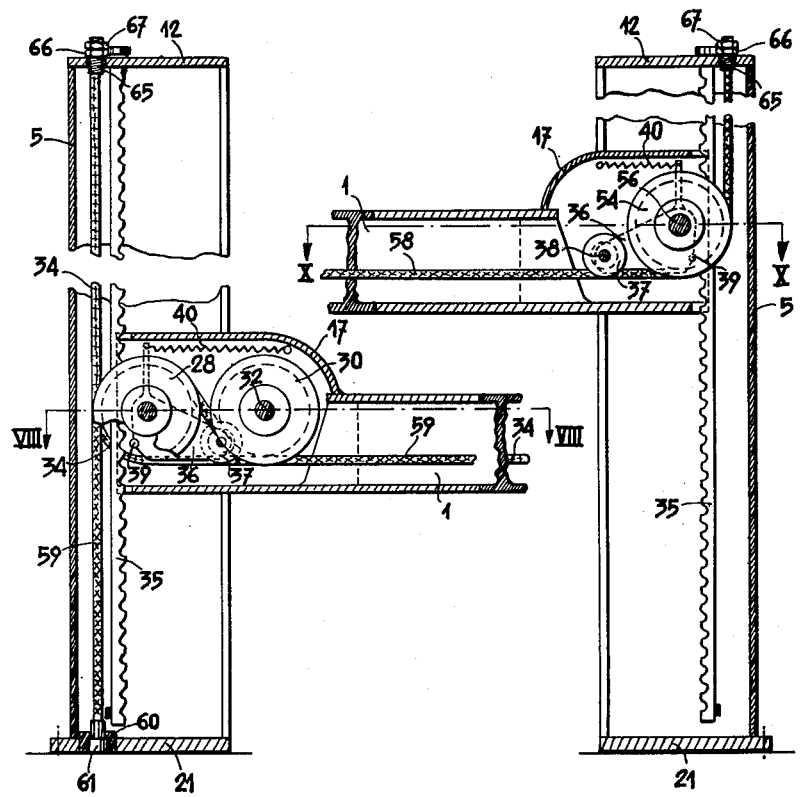
Inventor
Julio Villars.
BY 
Attorney Patented June 2, 1953

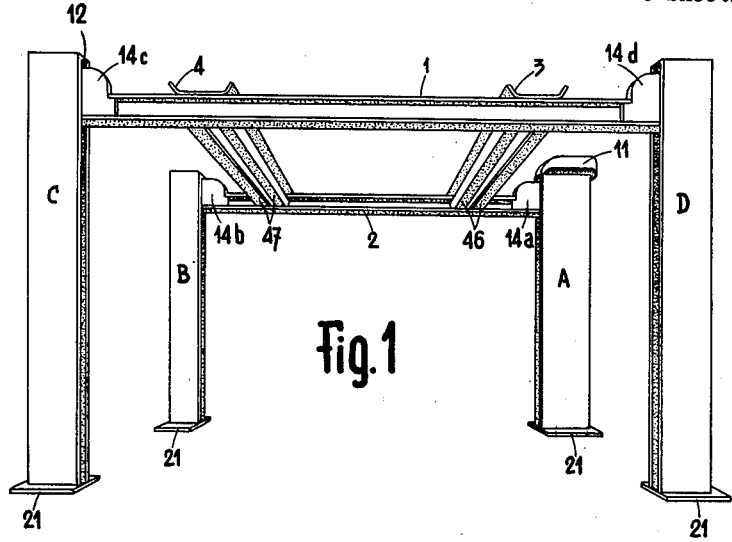
Fig. 1
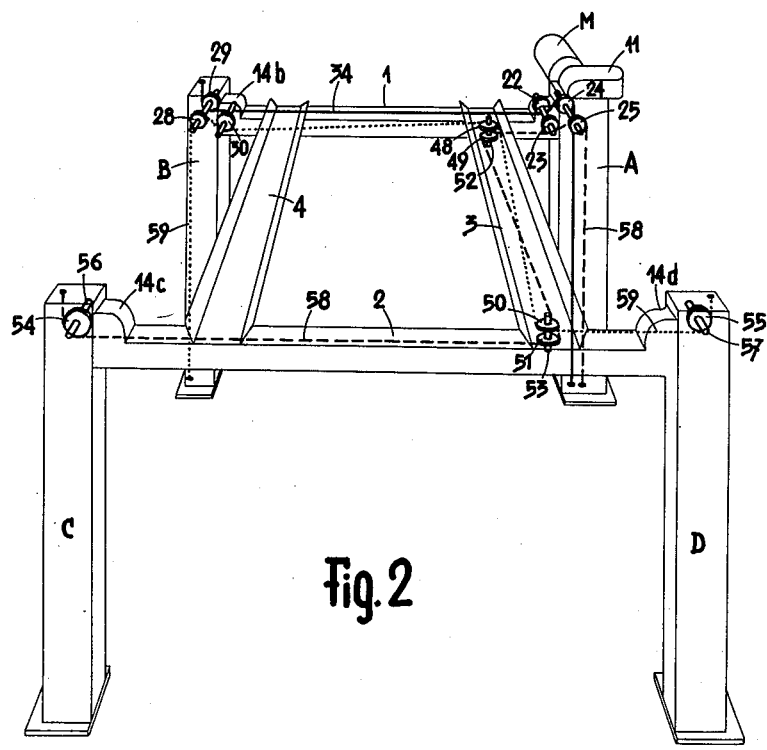
Fig. 2
Inventor
Julio Villars.
BY
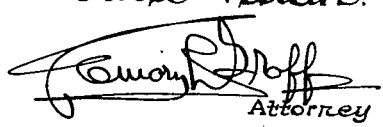
Attorney

2,640,562

UNITED STATES PATENT OFFICE 2,640,562

LIFTING APPLIANCE FOR VEHICLES

Julio Villars, Geneva, Switzerland

Application March 10, 1948, Serial No. 13,957
In Switzerland March 12, 1947

7 Claims. (Cl. 187—8.59)

There exists various types of lifting appliances for vehicles. These appliances include generally four columns between which is arranged a lifting frame constituted by cross-bars bearing runways, the ends of which slide in the said columns. Some of these lifting appliances include a screw housed in each of the columns, each of these screws being engaged in a nut carried by each of the ends of the lifting frame cross-bars. These four screws are linked to a motor by means of crowns, tangential screws and transmission shafts arranged either at their upper ends or at their lower ends. This kind of appliance has various drawbacks. Indeed, if the transmission parts linking the screws to the motor are arranged at the lower ends of the screws, these transmission parts must then be accommodated in gutters, which entails comparatively expensive installation work. In addition, some of these transmission parts (gears, bearings, etc.) must be enclosed in water tight casings, in order to protect them against water and mud. It is clear that these water tight casings are greatly inconvenient, call for permanent watching and are expensive.

If, on the contrary, the transmission parts linking the motor to the four screws are placed at the upper end of the screws, the transmission shafts are then arranged between the upper ends of the columns. These shafts may then prove themselves to be of much nuisance since, in the case of lifting appliances for road vehicles, for instance, if a door of a car has been carelessly left open, this door may get under one of the transmission shafts, thus provoking serious damage to the vehicle.

Other lifting appliances include a lifting frame operating device constituted by cables passing on guides fastened to the upper ends of the columns. One of the ends of each cable is fixed to one of the ends of the lifting frame cross-bars, while their other end is fixed to a winch operated by a motor. In such kind of appliance, the columns are subject at their upper ends to a pulling effort taking place in a horizontal plane and making it necessary to have stays connecting the upper ends of the columns. These lifting appliances have therefore the same drawbacks as the previously mentioned ones.

Some designers seeked to do away with the above mentioned drawbacks in making use, in order to ensure the lifting frame displacements, of a mechanism including, for instance, a fixed screw housed in each of the columns, and a nut fitted on each of the said screws and providing for a mechanical connection between each screw and each of the ends of the lifting frame cross-bars. Each screw is fastened to a cog wheel and these are linked together by an endless chain passing on guides or tightening parts carried by the lifting frame. One of these nuts is operated by a motor carried by the lifting frame.

This kind of appliance does not give full satisfaction because it is very difficult to ensure a thorough protection of the screws, of the nuts, of the chain and of the cog wheels against mud projections. The result is that these mechanical parts of the lifting appliance are too quickly worn out.

The object of the present invention is a lifting appliance for vehicle including at least three columns between which is arranged a lifting frame mechanically connected with a lifting device partly housed in the said columns. This appliance differs from the known appliances in that the lifting device includes, on one hand, a single driving member housed in one of the columns, this driving member being mechanically linked to one of the ends of the lifting frame and on the other hand, flexible connecting members, of constant length and passing on guiding organs carried by the mobile equipment, one of the ends of each connecting member being fixed to the lower end of the column, while the other end is fixed to the upper end of another column, the whole being so arranged that a displacement of the end of the lifting frame driven by the driving member causes a displacement of same direction and of same extent of all the lifting equipment, so that the latter is moving in a way parallel to itself, that is to say, it is always situated on a plane parallel to that it occupied before the said displacement.

The attached drawing shows diagrammatically and by way of example a form of execution of the lifting appliance which is the object of the invention.

The Fig. 1 is a perspective view.

The Fig. 2 is a diagrammatically perspective view, illustrating the connections effected by means of the flexible connecting members.

The Fig. 3 is a part transversal cross-section of the column A and of a part of the lifting frame along the line III—III of the Fig. 4.

The Fig. 4 is a part view in axial cross-section along the line IV—IV of the Fig. 3.

The Figs. 5 and 6 are views of details at a greater scale showing the fastening of the ends of the connecting members in the case when the said connecting members are constituted by cables.

The Fig. 7 is a part cross-section view along the lines VII—VII of the Fig. 3.

The Fig. 8 is a transversal cross-section view of the column B and of a part of the lifting frame along the line VIII—VIII of the Fig. 9.

The Fig. 9 is a cross-section view along the line IX—IX of the Fig. 8.

The Fig. 10 is a transversal cross-section view of one of the columns C and D along the line X—X of the Fig. 11.

The Fig. 11 is a cross-section view along the line XI—XI of the Fig. 10.

According to the diagrammatical drawing attached, the lifting appliance includes, like other known appliances: a lifting frame constituted by two cross-bars 1 and 2 carrying runways 3 and 4 for the vehicle (Fig. 1). This lifting frame is arranged between four independent columns or supports A, B, C, D anchored in the ground by any known (but not represented) means. Inside these columns is arranged, at least partly, a lifting device causing the displacement of the lifting frame in a way parallel to itself.

In the form of execution represented, each end of the cross-bars 1 and 2 is engaged in one of the columns A, B, C, D and slides inside thereof. Each column is constituted by an envelope 5 presenting in transversal cross-section the general shape of a U. One A of these columns has a depth $a$ greater than the depth $b$ of the other columns B, C, D. This column A protects a driving member 6 (Figs. 3 and 4) of the lifting frame. In the form of execution represented, this driving member is constituted by a screw of which the upper end carries a crown 7 in gear with a worm 8 fixed on the shaft 9 of a motor M. The latter is rigidly fixed to the column A and a casing 11 protects the worm 8 and the crown 7 against the water and the washing muds. A rest plate 12 is rigidly fixed on the end of the envelope and includes a bearing 13 into which revolves the upper end of the driving member 6. The latter is in addition suspended to this rest plate 12 by means of an axial stop.

In a type of construction of a device such as is shown in the drawing, the motor could be replaced by a manual operating member such as a crank handle.

The cross-bars 1 and 2 are constituted each by a double-T shaped iron, of which each end bears one of the four casings 14a, 14b, 14c, 14d containing guiding organs for the flexible connecting members. Each casing is constituted by the lower sole of the double T, two lateral flanges 16 and a protection sheet 17. The end of cross-bar 1 engaged in the column A carries in addition a tube 15 fixed to the ends of the lateral flanges 16 of the casing 14a.

Inside this tube 15, the axis of which is perpendicular to that of the driving member, is placed a nut 18 engaged on the screw 6. The latter goes through the tube 15 by coaxial drillings 19 made in the walls of the said tube 15. The lower end of the driving member 6 revolves in a bearing 20 fastened to a base plate 21 of the column A.

The casing 14a (Figs. 1, 3 and 4) contains four grooved pulleys 22, 23, 24, 25 revolving on axles 26, 27 the ends of which are fixed in the lateral flanges 16. The pulleys 22 and 23 revolve freely around the axle 26, while the pulleys 24 and 25 revolve freely around the axle 27. The grooves of the pulleys 22 and 24 are arranged in a same vertical plane, and the grooves of the pulleys 23 and 25 in a plane parallel to the latter. These two vertical planes are arranged on one and on the other side of the core of the double T constituting the cross-bar 1.

The casing 14b (Figs. 1, 8 and 9) contains three grooved pulleys 28, 29, and 30. The pulleys 28 and 29 revolve freely around an axle 31 of which the ends are fixed in the lateral flanges 16, while the pulley 30 revolves freely around an axle 32 parallel to the axle 31. A stay 33 fixes the axial position of the pulley 30 in such a way that the grooves of the pulleys 28 and 30 are situated in a same vertical plane, substantially the same as the vertical plane passing by the grooves of the pulleys 23, 25.

As shown on the Fig. 2, a cable 34 or another flexible connecting member passes in the grooves of the pulleys 24, 22 and 29. One of the ends of this cable 34 is fixed to the lower part of the column A, while its other end is fixed to the upper part of the column B. One sees that the part of this cable 34 situated between the pulleys 25 and 29 is housed in the part of the double T opening on the side opposite to that facing the columns C and D, and that the parts of this cable housed in the columns are substantially vertical. Indeed, the tying points of these ends are substantially situated in the intersection of the vertical plane of the groove of the pulley 29, respectively of the pulley 24 with the vertical plane tangent to the groove of this pulley 29, respectively 24.

The axle 31 carries in addition one of the parts of a safety device intended to lock, in case of the cable 34 breaking, the end of the cross-bar 1 in the position where it is at the time when the cable broke, this in order to avoid a rocking of the lifting frame. This safety device includes (Figs. 8 and 9) a rack 35 fastened to the envelope 5 of the column B, and an oscillating part 36 fitted on the axle 31 between the grooved pulleys 28 and 29. This oscillating part 36 carries a grooved roller 37 revolving freely around an axle 38 and a locking finger 39 arranged in front of the rack 35. A spring 40, of which one end is attached to a portion of the oscillating part 36 and the other to a part fastened to the cross-bar 1, endeavours to keep the roller 37 applied on the cable 34. In case of the latter breaking, the spring 40 causes an angular displacement of the oscillating part 36 and the insertion of the finger 39 in the toothing of the rack 35.

The runways 3 and 4 are each constituted by a sheet iron having in transversal cross-section the general shape of an open V (Figs. 1 and 4). This sheet is made rigid by reinforcements 46, 47 fixed to its lower face. The runways 3 and 4 rest on the cross-bars 1 and 2 by their ends protruding from the reinforcements 46 and 47 (Fig. 7). Their position along these cross-bars 1 and 2 is fixed by pins 42 housed in guides 43 fastened to one of the lateral walls of the reinforcements 46, 47 and of which the end engages itself in drillings 45 cut in the core of the double T constituting the cross-bars 1 and 2. The opposite end of each pin 42 is fitted with a controlling organ 44.

The reinforcements 46 carry at each of their ends two grooved pulleys 48, 49, 50, 51 (Figs. 2 and 4) revolving freely around vertical axles 52 and 53.

The casings 14c and 14d (Figs. 1, 10 and 11) carried by the cross-bar 2 each contain a grooved pulley 54, respectively 55 revolving freely around an axle 56, respectively 57, of which the ends are fastened in the flanges 16.

In addition, each axle 56, 57 carries an oscillating organ 36 similar to that described in connection with the Figs. 8 and 9. These oscillating organs 36 each carry a grooved roller 37 and a locking finger 39 intended to act each in conjunction with a rack 35 fastened to each of the columns C and D.

A second cable 59 or another flexible connecting member passes in the grooves of the pulleys 28, 36, 48, 50 and 55. One of the ends of this cable 59 is rigidly fixed to the lower part of the column B, while its other end is rigidly fixed to the upper part of the column D. The portion of the cable 59 situated between the pulleys 30 and 48 is housed in the part of the double T of the cross-bar 1 opening inwardly, that is to say on the side of the cross-bar facing the columns C and D. The part of the cable 59 situated between the grooved pulleys 48 and 50 is housed between the reinforcements 46 and, finally, the portion of the cable 59 situated between the grooved pulleys 50 and 55 is housed in the hollow part of the double T of the cross-bar 2 opening towards the inside, that is to say on the side of this cross-bar facing the columns A and B. Lastly, the portions of this cable situated in the columns B and D are practically vertical.

A third cable 58 passes in the grooves of the pulleys 25, 23, 49, 51 and 54. One of the ends of this cable 58 is attached to the lower part of the column A while its other end is attached to the upper part of the column C. The portion of this cable situated between the pulleys 23 and 49 is housed in the inside hollow of the double T constituting the cross-bar 1. The portion of this cable situated between the pulleys 49 and 51 is housed between the reinforcements 46 and the portion situated between the pulleys 51 and 54 is situated in the inside hollow of the double T constituting the cross-bar 2. Lastly, the portions of this cable 58 housed in the columns A and C are practically vertical.

As shown on the drawing (Figs. 10 and 11) the ends of the cables attached at the lower part of the columns are fixed to the base plate 21 of their respective column by means of the anchorage device shown on Fig. 6. This anchorage device includes a box 60 rigidly fixed to the base plate and a bushing 61 having a collar 62 resting on the bottom of the box 60. This bushing has a tapered drilling 63 in which the cable strands, doubled on themselves, are engaged. The smallest diameter of the tapered drilling is sufficient to accommodate the cable, but too small to let pass the end of the cable with its strands doubled against themselves. As a safety precaution, one can pour molten lead on the cable end inserted in the tapered drilling so as to prevent any possibility of the cable getting away.

The ends of the cables fixed to the upper parts of the columns are supported, by means of adjusting devices, to the upper rest plates 12 closing the upper ends of the envelopes 5. Each adjusting device (Fig. 5) includes a bushing 65 engaged in a drilling 69 of the rest plate and having a tapered drilling 63 similar to that of the bushing 61. The end of the cable is fixed in this tapered drilling 63 in the same way as that described above in connection with the Fig. 6. The externally threaded bushing 65 is engaged in a nut 66 resting on the rest plate 12. A counter-nut 67 blocked on the nut 66 after adjusting the axial position of the bushing 65 with respect to the rest plate enables to keep this position.

Finally, as shown on the Figs. 3 and 4, a protection sheet 68 safeguards the driving member 6, in order to avoid the deposit on this member of the residuary washing waters splashed about when a vehicle is being washed. This sheet 68 is fixed by its upper end to the rest plate 12 of the column A. On each side of this protection sheet is provided, on its full height, a passage for the flanges 16 of the casing 14a.

The operation of the appliance described above by way of example and with reference to the attached diagrammatical drawing is as follows:

First of all, one adjusts the length of the cables, or more precisely the position of their upper ends in relation to the rest plates 12 by means of the adjusting devices described with reference to Fig. 5, in such a way that the lifting frame should be situated in an horizontal plane, so that a vehicle placed on the runways 3 and 4 should have no tendency to move in any direction.

When the motor M is switched in by means of a standard type switch (not represented) this motor drives in rotation the driving member 6. According to the revolving direction of the latter, the end of the cross-bar 1 carrying the casing 14a and the nut 18 is vertically displaced towards the top or the bottom of the column A. This displacement automatically causes, thanks to the flexible connecting members, a displacement of same direction and same extent of each of the casings 14b, 14c, 14d. It follows that the lifting frame is displaced in a way parallel to itself. Indeed, the length of each cable being constant, and each cable being fixed by one of its ends to the lower part of a column and by its other end to the upper part of another column, and the cables being so arranged as to each carry one of the ends of the cross-bars 1 and 2 bearing the casings 14b, 14c and 14d, it is clear that these three ends of the cross-bars 1 and 2 are compulsorily and simultaneously displaced in the same direction as the end of the cross-bar 1 carrying the casing 14a and that the extent of these displacements are even.

As described above, in case of a cable breaking, the spring 40 of the corresponding safety device causes the rocking of the part 36 and the insertion of its finger 39 in the toothing of the corresponding rack 35. Thus this safety device precludes any rocking of the lifting frame, which remains horizontal.

The distance between the runways 3 and 4 can be selected and adjusted at will by means of pins 42, of which the ends can be engaged in one or another of the drillings 45. One can see that the cables passing on the pulleys 30, 48, 50 and 23, 49, 51 are housed in the inner hollows of the double T constituting the cross-bars 1 and 2 and between the reinforcements 46, so that nothing prevents the runway 3 from being displaced along the cross-bars 1 and 2. Moreover, such a displacement changes in no way the position occupied by the lifting frame, as it is easy to see in examining the Fig. 2 of the attached drawing.

A form of execution of the object of the invention has been described here by way of example and in reference to the drawing, but it is obvious that all the described parts and devices can be replaced by their equivalents without any difficulty.

For instance, one could provide only three columns arranged at the summits of a triangle. In this case, only two cables would be required. These two cables being then attached by one of their ends to the lower part of the column containing the driving member, the other end of each of these cables being each attached to the upper end of one of the two other columns, each of these carry one of the two ends of the lifting frame not mechanically linked to the driving member. The latter could also, in an alternative design of the described appliance, be constituted by a cable attached to one of the ends of the mobile equipment and coiling itself on a winch operated by the motor. In another alternative design of the described appliance, the operating part could be constituted by a chain carrying one of the ends of the cross-bar 1. This driving member could also be constituted by an hydraulic jack.

One sees that in the appliance which is the object of the invention, the columns are entirely independent one from the others. Indeed, these columns are subject to no pulling effort in an horizontal plane, so that the stays connecting the upper ends of these columns of certain known lifting appliances have no longer any reason to exist.

I claim:

1. A lifting appliance for vehicles and the like comprising four vertical columns each having vertical guideways opening at the inner sides thereof, a lifting frame horizontally disposed and including a pair of crossbars whose opposite ends are slidable in related guideways of the columns, a pair of runways resting on the crossbars, a driving member supported by one of the columns for raising and lowering said lifting frame, three flexible members, one of said flexible members being fastened at one end to the lower end portion of the column supporting the driving member and fastened at the other end to the upper end of a second column, the second flexible member being fastened at one end to the second column adjacent the lower end thereof and fastened at the other end to a third column, adjacent the upper end thereof, the third flexible member being fastened at one end to the first column adjacent the lower end thereof and also fastened at the other end to a fourth column adjacent the upper end thereof, sheaves rotatably mounted at opposite ends of each of said crossbars and guiding said flexible members, certain of said sheaves being supported by the flexible members, and other sheaves rotatably mounted on said runways and guiding said flexible members.

2. A lifting appliance according to claim 1 wherein the columns are supported on the ground and are free from connection with each other except for the flexible members, and wherein portions of the flexible members are housed in the columns and the remaining portions are housed in the frame, and, wherein some of the sheaves are carried by the ends of the crossbars and at least one of the runways carries other of the sheaves, and reinforcements each carried by one of the runways and housing part of the flexible members between the sheaves thereon.

3. A lifting appliance for vehicles and the like, comprising, four vertical columns, a lifting frame horizontally disposed between the columns, a single driving member vertically suspended from the upper end of one of the columns and supporting one of the corners of the lifting frame, sheaves carried by the frame, three flexible members guided by the sheaves, each of said flexible members having one of its ends rigidly affixed to the upper end portion of a related column and the other end rigidly affixed to the lower end portion of another column, said three flexible members supporting the three other corners of said frame and maintaining the frame in a substantially horizontal position, the portion of each flexible member between the fixed end and the adjacent sheave on the frame being vertically disposed, whereby said columns are subjected only to vertical loading forces.

4. A lifting appliance for vehicles and the like, comprising, four vertical columns, a frame including a pair of crossbars and a pair of runways resting thereon, sheaves carried by the opposite ends of each crossbar and other sheaves carried by opposite ends of one of the runways, three cables guided beneath said sheaves on the crossbars, a single screw suspended from the upper end of a column, a nut engaged by the screw and mounted in one end of one of the crossbars, both ends of each of said cables being fastened to fixed points on the columns, one end of each cable being rigidly fastened to the upper end portion of a column and the other end of each cable being rigidly fastened to the lower end portion of another column, said three cables supporting the three other ends of said crossbars remote from the screw, each cable portion between one of its ends and the adjacent sheave on the crossbars being housed in a column and vertically disposed, and means carried by the upper end of the column for driving the screw, and all of said columns being subjected only to vertical forces.

5. A lifting appliance according to claim 4, wherein the runways are reinforced and one of them houses horizontal portions of the cables guided by the sheaves rotatably mounted at the ends of said runway, the vertically disposed cable portions being housed in the columns and the remaining horizontal cable portions being housed in the crossbars.

6. A lifting appliance according to claim 4, wherein the crossbars have a double T cross section and the runways are reinforced, the runway having the sheave thereon being rigidly fixed to the cross bars, and the other runway being displaceable along the crossbars, portions of the cables being housed in the reinforcement of the fixed runway, the vertically disposed portions of the cables being housed in the columns and the remaining portions in the crossbars.

7. A lifting appliance for vehicles and the like comprising four vertical columns, a lifting frame horizontally disposed and guided by the columns, said frame including a pair of cross bars and a pair of runways resting thereon, a single driven member suspended from the upper end portion of one of the columns and supporting one corner of said frame, sheave means carried by the frame actuated by said driven member, some of the sheave means being rotatably mounted at the ends of the runways and other of said sheave means being rotatably mounted at each end of said cross bars and housed in the columns, and three flexible members passing over said sheave means, each of said flexible members being rigidly fastened at one of its ends to the lower end portion of a column and at its other end to the upper end portion of another column, said flexible members supporting the three other corners of said frame remote from said driven member, and the portion of said flexible members located between said sheave means and their fastening point being vertically disposed.

JULIO VILLARS.

References Cited in the file of this patent

UNITED STATES PATENTS

| Number | Name | Date |
|---|---|---|
| 1,700,711 | Schellentrager et al. | Jan. 29, 1929 |
| 2,124,726 | Blum | July 26, 1938 |
| 2,139,957 | Martin | Dec. 6, 1938 |
| 2,250,965 | Pritz | July 29, 1941 |
| 2,564,267 | Manke | Aug. 14, 1951 |

FOREIGN PATENTS

| Number | Country | Date |
|---|---|---|
| 441,280 | Great Britain | Jan. 16, 1936 |